United States Patent Office 3,227,766
Patented Jan. 4, 1966

3,227,766
STABILIZATION OF HYDROCARBON HALIDES
Carl W. Kruse and Roger F. Kleinschmidt, Bartlesville, Okla., assignors to Phillips Petroleum Company, a corporation of Delaware
No Drawing. Filed July 2, 1962, Ser. No. 207,009
2 Claims. (Cl. 260—666)

This invention relates to the stabilization of tertiary halides against decomposition as during heating. In one aspect it relates to the use of a novel stabilizer for inhibiting the decomposition of tertiary alkyl and tertiary cycloalkyl halides when subjected to distillation to remove impurities.

Various processes have been developed for the production of tert-alkyl halides and tert-cycloalkyl halides. Most of these processes involve halogen exchange reactions between a lower tert-alkyl halide, such as tert-butyl chloride, and a hydrocarbon having a tertiary carbon atom, such as methylcyclohexane.

The resulting tert-cycloalkyl halides and tert-alkyl halides, hereinafter referred to as tertiary halides, have been used as alkylating agents and have also been used as starting materials for the preparation of various olefins. In this latter application, the tertiary halides are subjected to dehydrohalogenation in the presence of a catalyst. Since the preparation of olefins through such a dehydrohalogenation step is usually pointed toward the production of a particular olefin, in high purity, and to the exclusion of close boiling isomers and homologs, it is necessary in many instances to purify the tertiary halides immediately prior to the dehydrohalogenation step. The method generally used for purification of these tertiary halides is distillation, and with the most frequently encountered impurities being lower boiling than the tertiary halide. The tertiary halide product is withdrawn as bottoms from this fractionation. Herein lies one major problem with purification through distillation. The temperatures in the fractionator kettle are frequently high enough to cause dehydrohalogenation, thus causing loss of product. To one skilled in the art, it might be obvious to use an inhibitor, but this expedient is further complicated by the fact that the inhibitor must stay in the kettle with the halide, and if olefins are to be prepared from the tertiary halides this tertiary halide-inhibitor mixture must then be capable of being catalytically dehydrohalogenated, preferably without further purification or separation of the inhibitor.

It is, therefore, an object of this invention to provide stabilizers for the prevention of thermally-induced dehydrohalogenation of tertiary halides.

It is another object of this invention to provide a process for the purification of tertiary halides prior to the catalytic dehydrohalogenation thereof to the corresponding olefins.

It is a still further object of this invention to provide stabilizers which do not inhibit the subsequent catalytic dehydrohalogenation of the purified tertiary halides.

We have discovered that the presence of a low concentration of a heterocyclic nitrogen-containing compound as hereinafter defined having a boiling point at least as high as the compound being purified renders tertiary halides stable during subsequent heating of a crude mixture thereof to remove impure components which have a boiling point below that of the desired compound. In this manner, premature conversion of the tertiary halides to the corresponding olefins via thermally induced dehydrohalogenation while heating at atmospheric pressure can be precluded.

According to the process of this invention, the thermal dehydrohalogenation of tertiary halides during the removal of impurities by distillation of temperatures above ambient is minimized or eliminated by the addition thereto of a finite amount of a heterocyclic nitrogen-containing compound boiling at or above the boiling point of the particular halide to which the stabilizer is being added.

The tertiary halides which can be stabilized by the process of this invention are those mono-chlorinated hydrocarbons or mono-brominated hydrocarbons wherein the chlorine or bromine atoms are attached to a carbon, which in turn is connected to three other carbon atoms, and which have a boiling point at pressures of from about 1 to 760 mm. mercury absolute pressure, of from about 100 to about 200° C.

These tertiary halides will generally contain from 6 to 15 carbons and can be mono-chlorinated and mono-brominated alkanes and cycloalkanes. One group of tertiary halides which are particularly adapted to stabilization by means of the heterocyclic nitrogen-containing compounds hereinafter described are those represented by the formula:

wherein $R_1$ is an alkylene radical containing from 4 to 5 carbon atoms, inclusive; X is selected from the group consisting of chlorine and bromine; and $R_2$ is an alkyl radical containing from 1 to 3 carbon atoms, inclusive; and wherein the total carbons in the compound range from 6 to 9 inclusive.

Some examples of tertiary halides which can be stabilized by the method of this invention are: 2-chloro-2,3-dimethylbutane, 2-bromo-2,3-dimethylpentane, 3-chloro-3,4-diethylhexane, 4-chloro-2,2,4 - trimethylpentane, 3-bromo-3-methylheptane, 2-chloro-2,3-dimethyldecane, 3-bromo-2,3,3-trimethyldodecane, 1-chloro-1-methylcyclopentane, 1-chloro-1-methylcyclohexane, 1-chloro-1,2-dimethylcyclohexane, 1-chloro-1,2,3,4-tetramethylcyclohexane, 1-bromo-1-ethylcyclohexane, 1-chloro-1-ethylcyclopentane, 1-bromo-1,4-diethylcyclohexane, 1-chloro-1-n-propylcyclopentane, and 4a-chlorodecalin.

While tertiary bromides and chlorides can be stabilized by the present invention the dehydrohalogenation inhibitors of this invention are particularly applicable to the prevention or retardation of thermal dehydrochlorination of 1-alkyl-1-chlorocycloalkanes, particularly 1-alkyl-1-chlorocyclohexanes.

The heterocyclic nitrogen-containing compound stabilizers of this invention can be represented by the formulas:

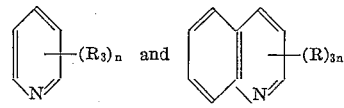

wherein each $R_3$ is a 1 to 3 carbon alkyl radical, and n is an integer of from 0 to 3, inclusive.

Some specific examples of compounds of the above general formulas are pyridine, 2-picoline, 3-picoline, 2-ethylpyridine, 4-ethylpyridine, 2,4-lutidine, 3,4-lutidine, 2-methyl-5-ethylpyridine, 2,6-diethylpyridine, 3-n-propylpyridine, 2-methyl-5-isopropylpyridine, 2,4,6-collidine, 3,4,5-triethylpyridine, 2-methyl - 4 - ethyl-6-n-propylpyridine, 3,4,6-tri-n-propylpyridine, quinoline, 2-methylquinoline, 2,6-dimethylquinoline, 4-ethylquinoline, 3-n-propylquinoline, 2,3,4-trimethylquinoline, 2,8-diethylquinoline, 2,6-di-n-propylquinoline, 2 - methyl-4-ethyl-7-n-propylquinoline and 2,4,6-tri-n-propylquinoline.

The use of the stabilizers or inhibitors of this invention enables one to subject the above-defined tertiary halides to temperatures of from 100 to 200° C. such as are encountered in the pot of a distillation column, without effecting dehydrohalogenation. If the normal boiling point of the particular tertiary halide lies above about 200° C., it is necessary to utilize subatmospheric pressures to lower the boiling point into the range wherein the stabilizers are effective. Although the lower limit, 100° C., is one below which thermal dehydrohalogenation is usually not troublesome, one can use these stabilizers below 100° C., if desired. It should be clearly pointed out that one should select a heterocyclic N-containing compound stabilizer whose boiling point, at the conditions of pressure and temperature encountered in the distillation column kettle, is at least as high as the tertiary halide being stabilized.

The pyridine compounds of Formula I, above which contain nuclear alkyl substituents and which boil at or above the boiling point of the tertiary halides described above are preferred as inhibitors according to this invention. Some examples of pyridine compounds of this type which can be used and which are particularly useful for inhibiting the thermal dehydrochlorination of 1-methyl-1-chlorocyclohexane are 2-methyl-5-ethylpyridine, 3-ethylpyridine, 4-ethylpyridine, 2-isopropylpyridine, 2,4-lutidine, 3,4-lutidine, and the like. All these compounds boil above the 151–154° C. boiling point of 1-methyl-1-chlorocyclohexane. If lower boiling tertiary halides are to be inhibited, such as 1-methyl-1-chlorocyclopentane, then lower boiling pyridine compounds, such as the picolines, can be used.

The amount of heterocyclic N-containing compound stabilizers charged to the purification zone will depend at least to some extent on the amount of free acid present in the reaction mixture from the chlorine exchange reaction. The amount of inhibitor should thus be sufficient to neutralize the free acid present and to provide an excess. The excess will generally be less than 5% by weight above that required to neutralize the acid, more usually less than 2%, and frequently about 1%. Generally, the amount of stabilizer added will not be more than 5 mol percent based on the tertiary chloride present in the reaction mixture to which the stabilizer is added.

In one method of forming the tertiary halides, whose thermal dehydrohalogenation is to be retarded or prevented by the inhibitors of this invention, a hydrocarbon containing a tertiary carbon atom is reacted with a tert-alkyl halide. For example, methylcyclohexane is reacted at ambient temperature with tert-butyl chloride in the presence of an acid catalyst. Reaction times are short when adequate mixing is provided, and one convenient reactor for this reaction is a centrifugal pump. The reaction mixture is then purified by heating in a distillation column to drive off the lower boiling impurities. After the impurities have been removed, the tertiary halide (1-methyl-1-chlorocyclohexane) can then be dehydrochlorinated catalytically using a catalyst such as oxidized charcoal. The dehydrochlorination is also conveniently carried out in a distillation column by adding the catalyst to the kettle and withdrawing olefin and HCl off as overhead. Thus, in a batch operation the purification and subsequent dehydrochlorination can be carried out in the same vessel. In a continuous operation, the kettle product from the purification can be charged to the kettle of a dehydrochlorination tower along with the catalyst. In either method of operation, the inhibitor charged during purification will also be present during catalytic dehydrochlorination. Surprisingly, the inhibitor will prevent thermal dehydrochlorination during purification, but does not affect dehydrochlorination in the presence of the dehydrohalogenation catalyst.

In the example, the use of $AlCl_3$ as a dehydrochlorination catalyst has been described. However, other types of dehydrochlorination catalyst may be used. For example, certain types of specially activated charcoal can be used.

It has also been found, however, that a conventional activated carbon can be made particularly active for dehydrohalogenation reactions by an oxidizing treatment in air at elevated temperatures. Indeed, carbon may be favorably affected by air in this way even at low temperature such as room temperature but the action, which may conceivably require months or years, is too slow to be convenient. It is, therefore, more convenient to carry out the oxidative treatment at temperatures greater than about 300° C. and more preferably at temperatures of 500–700° C. At these higher temperatures, the time of treatment will vary between one second to about one hour but will generally be about 1–15 minutes. Some minor loss of carbon also generally takes place in the treatment. If desired, the air used for the oxidizing treatment may be diluted with inert gases to better control the treatment and to minimize combustion losses.

The particle size of the oxidized activated carbon may vary over a wide range. Particles smaller than 325 mesh (U.S. series) are useful as well as granular material of about 6 mesh, and smaller. The granular material is favored for continuous fixed bed type reactions.

In addition to active carbons, the afore-described activation is applicable to carbon black pigments as well. The oxidation of carbon black under the conditions stated earlier also produces a material catalytically active for dehydrohalogenation.

The following specific example is intended to illustrate the advantages of the present invention, but it is not intended to limit the invention to the specific embodiments shown therein.

EXAMPLE I

A run was carried out in which methylcyclohexane was converted to 1-chloro-1-methylcyclohexane by chlorine exchange with tert-butyl chloride. This material was then purified by fractionation in the presence of one of the inhibitors of this invention and subsequently dehydrochlorinated over a dehydrochlorination catalyst to 1-methylcychlohexene.

In the reaction of tert-butyl chloride with methylcyclohexane, the chlorine exchange reaction was carried out in the presence of aluminum chloride complex catalyst in a reactor fashioned from a stainless steel pump. The reactor employed was constructed from a stainless steel centrifugal pump, and to the pump was connected a glass reservoir from which methylcyclohexane-tert-butyl chloride mixture could be charged. Another glass reservoir was provided for storage and charging of aluminum chloride complex catalyst. Nitrogen gas was introduced above the methylcyclohexane-tert-butyl-chloride solution to maintain the desired pressure, and the rate of flow was controlled through a valve. A higher pressure was maintained above the complex catalyst reservoir to assure no backup through the needle valve which was used to regulate the rate of catalyst addition. The reactants were admitted to a tube loop connecting the outlet of the pump to its intake. The reactants were admitted to the loop near the pump inlet, and the products were withdrawn near the exit side of the pump.

The aluminum chloride complex catalyst was obtained from a commercial diisopropyl unit wherein isobutane is alkylated with ethylene in the presence of aluminum chloride. This complex contained 58 weight percent aluminum chloride, the remainder being hydrocarbon. It has previously been stabilized by heating to 140° F. to remove dissolved HCl and low boiling hydrocarbons.

In the run, a mixture of 3.98 moles of methylcyclohexane and 6.08 moles of tert-butyl chloride was added to the hydrocarbon reservoir of the reactor and the reaction loop until the entire system was liquid full. Aluminum chloride complex catalyst was charged to the catalyst reservoir of the reactor and, when the pump was started, sufficient catalyst was added to provide 3.4 weight percent of the hydrocarbon-chloride mixture. The solutions containing the methylcyclohexane and tert-butyl chloride were passed through the reactor at 100–200 ml. per minute which provided 0.5 to 1.0 minute residence time. The effluents were cooled in a receiver which was cooled in ice water and the receiver vent was connected to a trap cooled with Dry Ice. The cooled reactor effluents were decanted from the catalyst and were then washed with water. The material was then analyzed by gas-liquid chromatographic analysis.

The effluent from this run was found to contain 4.7 weight percent isobutane, 44.8 percent tert-butyl chloride, 25.5 weight percent methylcyclohexane, 15 weight percent 1-methyl-1-chlorocyclohexane and 9.9 weight percent of secondary methylcyclohexane chlorides.

The above-described effluent from the chlorine exchange reaction was distilled under two sets of conditions to remove components boiling below 1-methyl-1-chlorocyclohexane. The first distillation run was conducted at atmospheric pressure. The second was carried out at atmospheric pressure with 1 weight percent of 2-methyl-5-ethyl-pyridine (MEP) added to the crude effluent. The results of these distillation runs are expressed below in Table I:

Table I

| Run No. | Distillation Conditions | Total Weight, Grams | Grams 1-Cl MCH[1] | Time, Hours | Kettle Temp., °C. | Percent of 1-Cl MCH in Charge Recovered | Loss of 1-Cl MCH, Percent |
|---|---|---|---|---|---|---|---|
| 1 | Atmospheric | 327 | 49.0 | 2.0 | 153 | 51.8 | 48.2 |
| 2 | Atmospheric (plus 1% MEP) | 152 | 22.8 | 2.5 | 156 | 98.7 | 1.3 |

[1] 1-methyl-1-chlorocyclohexane.

Run 1 shows the high degree of thermally-induced premature dehydrohalogenation of the cycloalkyl halide during purification of the crude halide. Run 2 shows superior stabilization of the crude halide during distillation.

The pot residue from the inhibited atmospheric distillation was then subjected to dehydrochlorination over oxidized charcoal. The dehydrochlorination proceeded normally, yielding primarily methylcyclohexenes. There was no evidence that the inhibitor affected the dehydrochlorination over this catalyst in any way.

Various modifications and alterations of this invention will become apparent to those skilled in the art without departing from the scope and spirit of this invention and it should be understood that the latter is not necessarily limited to the aforementioned discussion.

We claim:
1. A process for producing monoolefins comprising: stabilizing a crude mixture containing a halide selected from the group consisting of tertiary alkyl halides, tertiary cycloakyl halides, and mixtures thereof, said halides having 6 to 15 carbon atoms per molecule and the halogen being selected from the group consisting of chlorine and bromine, by adding thereto a compound represented by the general formulas:

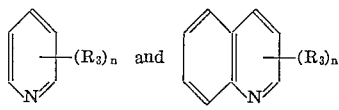

wherein each $R_3$ is a 1 to 3 carbon alkyl radical, and $n$ is an interger of from 0 to 3, inclusive, in an amount ranging from about 1 to 5 mol percent based on the tertiary halide present; heating the resulting stabilized mixture to remove the lower boiling constituents therefrom; dehydrohalogenating the resulting purified halide with charcoal catalyst produced by subjecting said charcoal to free-oxygen containing gas at a temperature in the range of from 300 to 700° C. for a period of time from one second to one hour; and recovering the olefins.

2. The process of claim 1 wherein said halide is 1-methyl-1-chlorocyclohexane, and said compound is 2-methyl-5-ethylpyridine.

References Cited by the Examiner
UNITED STATES PATENTS

| | | | |
|---|---|---|---|
| 2,370,552 | 2/1945 | Lincoln et al. | 260—648 |
| 2,490,973 | 12/1949 | Leonard et al. | 260—666 |
| 2,721,883 | 10/1955 | Stevens | 260—652.5 |
| 2,879,311 | 3/1959 | Hawkins | 260—654 |
| 3,031,412 | 4/1962 | Petering et al. | 260—652.5 X |

LEON ZITVER, *Primary Examiner.*